(12) United States Patent
Kataoka (10) Patent No.: US 6,795,838 B1
(45) Date of Patent: Sep. 21, 2004

(54) APPARATUS AND METHOD FOR TRANSFORMING MATHEMATICAL EXPRESSION, AND STORAGE MEDIUM

(75) Inventor: Toshiyuki Kataoka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/498,011

(22) Filed: Feb. 4, 2000

(30) Foreign Application Priority Data

Feb. 5, 1999 (JP) ............................................ 11/029366

(51) Int. Cl.$^7$ ........................... G06F 3/00; G06F 15/00; G06K 9/00
(52) U.S. Cl. ...................... 708/160; 708/131; 708/200; 382/187; 382/189
(58) Field of Search ................................ 708/142, 131, 708/530, 168, 443, 538, 160, 200; 345/804, 440; 382/187, 189

(56) References Cited

U.S. PATENT DOCUMENTS

| | | | | |
|---|---|---|---|---|
| 5,189,633 A | * | 2/1993 | Bonadio ..................... | 708/142 |
| 5,428,738 A | * | 6/1995 | Carter et al. ................ | 345/804 |
| 5,432,721 A | * | 7/1995 | Satoh ......................... | 708/168 |
| 5,469,538 A | * | 11/1995 | Razdow ...................... | 345/440 |
| 5,526,475 A | * | 6/1996 | Razdow ...................... | 708/443 |
| 5,544,262 A | * | 8/1996 | Pagallo ....................... | 382/189 |
| 5,559,939 A | * | 9/1996 | Wada et al. ................ | 707/538 |
| 5,566,248 A | * | 10/1996 | Ulrich ........................ | 382/187 |
| 5,680,638 A | * | 10/1997 | Satoh ......................... | 708/142 |
| 5,844,555 A | * | 12/1998 | Menaker et al. ............ | 707/530 |
| 6,142,367 A | * | 11/2000 | Satoh et al. ................ | 708/168 |

FOREIGN PATENT DOCUMENTS

| | | |
|---|---|---|
| JP | 03-8064 A | 1/1991 |
| JP | 09-81554 A | 3/1997 |

OTHER PUBLICATIONS

Garst, Modeless Gesture Driven Editor for Handwritten Mathematical Expressions, Mar. 18, 2004, U.S. Patent Application Publication No. US 2004/0054701A1.*

Rosin et al., Web Channel Guide Graphical Interface System and Method, Aug. 9, 2001, U.S. Patent Application Publication No. 2001/0012024 A1.*

* cited by examiner

Primary Examiner—Todd Ingberg
Assistant Examiner—Chat C. Do
(74) Attorney, Agent, or Firm—Sughrue Mion, PLLC (57) ABSTRACT

An apparatus capable of obtaining a result which is desired by an operator, canceling a result when an erroneous operation is performed and facilitating creation of a mathematical expression is provided. This apparatus comprises an indicating mechanism for outputting a position in a mathematical expression and a part in a mathematical expression in accordance with an operation of the operator; an operating mechanism for generating a plurality of proposed transformation results of the mathematical expressions based on the position and the part outputted from the indicating mechanism, and a selecting mechanism for selecting one from a plurality of the proposed transformation results in accordance with an operation of the operator.

19 Claims, 9 Drawing Sheets

FIG.4(c)   c1
$y+c=ax+b$
m1
$$y+c-(ax+b)=0$$
$$\frac{y+c}{ax+b}=1$$
$$ax+b=y+c$$
w1

FIG.4(d)   c1
$y+c=ax+b$
m1
$y-(ax+b)+c=0$   w1

FIG.4(e)   c1
$y+c=ax+b$
m1
$-(ax+b)+y+c=0$
$$\frac{y+c}{ax+b}=1$$
$$ax+b=y+c$$
w1

$y+c\models ax+b$

⇩ ⟵ INPUT OF "/"

FIG.9(b)

$y+c\models ax+b$ $$\frac{y+c}{\phantom{d}}=\frac{ax+b}{\phantom{d}}$$

$$y+\frac{c}{\phantom{d}}=ax+b$$

⇩ ⟵ INPUT OF "d"

FIG.9(c)

$y+c\models ax+b$ $$\frac{y+c}{d}=\frac{ax+b}{d}$$

$$y+\frac{c}{d}=ax+b$$

⇩ ⟵ INPUT OF "-2k"

FIG.9(d)

$y+c\models ax+b$ $$\frac{y+c}{d-2k}=\frac{ax+b}{d-2k}$$

$$y+\frac{c}{d-2k}=ax+b$$

$y+c\models ax+b$ $$\frac{y+c}{d-2k}=\frac{ax+b}{d-2k}$$

$$y+\frac{c}{d-2k}=ax+b$$

$y+c=ax+b$ $$y+\frac{c}{d-2k}=ax+b$$

APPARATUS AND METHOD FOR TRANSFORMING MATHEMATICAL EXPRESSION, AND STORAGE MEDIUM

BACKGROUND OF THE INVENTION

1. Field of the Invention

The present invention relates-to an apparatus and a method for transforming a mathematical expression by using a computer, and a storage medium.

2. Description of the Related Art

In recent years, a throughput of a computer has been improved by leaps and bounds. With the improvement in throughput of a computer, a GUI (Graphical User Interface) by which an operator can visually grasp contents easily has been widespread as an interface between the operator and the computer. The GUI basically has such an advantage as that data created on a screen can be directly obtained by printout and the like. Therefore, a word processor software or a graphic drawing software has been recently produced by using the GUI.

With such a background, mathematical expressions are also created or edited by using the computer. Although only input of mathematical formulas or modification of inputted mathematical expressions are carried out in the prior art when creating numerical expressions, a software for automating transformation of mathematical expressions (for example, transposition of terms, development and others) has been produced in recent years. Such a technique is disclosed in, for example, U.S. Pat. No. 5,189,633 (Feb. 23, 1993) "APPARATUS AND METHOD FOR INTERACTIVELY MANIPULATING MATHEMATICAL EQUATIONS." Further, such a function is realized in a software "Graphing Calculator" incorporated in a computer of Apple Computer Inc.

Here, a technique relating to a conventional mathematical expression transformation using a computer will be described with reference to FIGS. 11 and 12.

Figure 11:
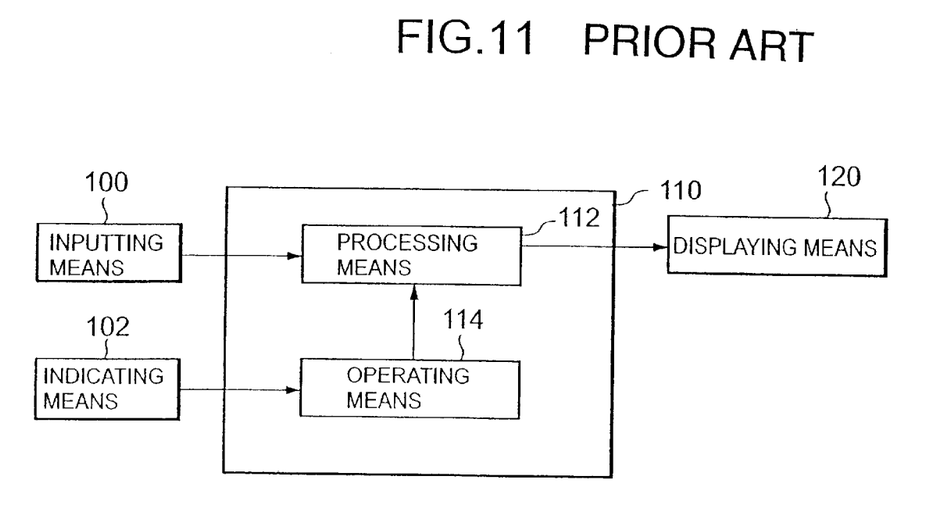
FIG. 11 is a block diagram showing the structure of a prior art.
Figure 12:
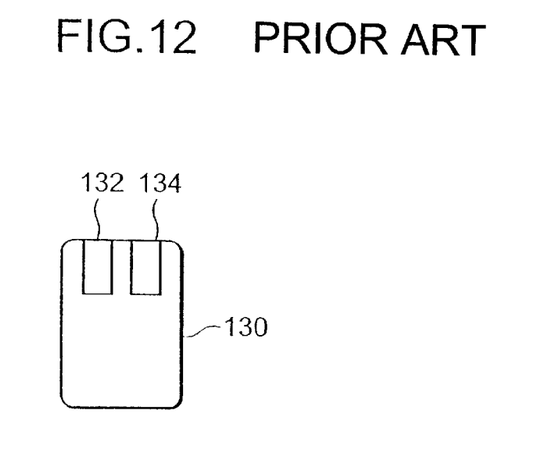
FIG. 12 is a view showing the structure of a mouse.

Referring to FIG. 11, inputting means 100 is, e.g., a keyboard, and indicating means 102 is, for example, a mouse 130 illustrated in FIG. 12. The inputting means 100 is mainly used when an operator inputs a mathematical formula in order to output mathematical expression data associated with the inputted mathematical formula. The indicating means 102 is mainly used when the operator indicates positions at which transformation is carried out, and it outputs the indicated mathematical expression which is a target of modification and a coordinate. Further, this means 102 outputs an indication signal for indicating the transformation processing. As shown in FIG. 12, a mouse 130 has a left button 132 and a right button 134. Indication signals such as "Left Down", "Left Up", "Right Down" and "Right Up" are outputted by pressing or releasing the left button 132 and the right button 134, respectively.

A computer 110 is, for example, a general personal computer. The computer 110 has processing means 112 and operating means 114.

The processing means 112 creates display data based on mathematical expression data outputted from the inputting means 100. Further, the operating means 114 produces a result of transformation mathematical expression based on the mathematical expression to be modified and the coordinate indicated by the indicating means 102.

Displaying means 120 is a display unit such as a CRT (cathode ray tube) and displays display data produced by the processing means 112.

The operation of the prior art technique having such a configuration will now be described hereinafter.

When the operator inputs a mathematical expression by the inputting means 100, the expression data is first outputted from the inputting means 100 to the processing means 112. The processing means 112 generates the display data from the inputted mathematical expression data and outputs it to the displaying means 120. The displaying means 120 displays the display data outputted from the processing means 112.

The operation when modifying (transforming) a specific position in the mathematical expression inputted by the operator will now be explained. In this case, the operator first specifies an element in the mathematical formula displayed on the display means 120 by operating the operating means 102. Moving a cursor of the mouse 130 onto the specified element and pressing the left button 132 cause the indicating means 102 to output the mathematical formula to be operated and the indication signal "Left Down."

When the mathematical expression to be operated and the indication signal "Left Down" are inputted from the indicating means 102, the operating means 114 retains the mathematical formula to be operated (this retention of the mathematical formula will be referred to as "grab" hereinafter).

Subsequently, when the operator moves the cursor of the mouse 130 while keeping pressing the left button 132, the indicating means 102 maintains output of the indication signal "Left Down" and outputs a coordinate which sequentially varies in accordance with movement of the cursor.

Upon input of the coordinate which sequentially varies and the indication signal "Left Down" from the indicating means 102, the operating means 114 confirms that the indication signal "Left Down" is continuously inputted and moves the grabbed element (this processing will be referred to as "drag" hereinafter).

At last, when the operator drags to the coordinate for operation and thereafter releases the left button 132 on that coordinate, the indicating means 102 outputs the indication signal "Left Up."

Upon receiving the indication signal "Left Up" from the indicating means 102, the operating means 114 lets dragged element down onto that coordinate (this processing will be referred to as "drop" hereinafter).

Moreover, at this time, the operating means 114 generates a transformation result of the mathematical formula based on the dropped mathematical expression to be operated and the coordinate for the operation and outputs it to the processing means 112. Here, the operating means 114 produces a transformation result in accordance with mathematical rules.

The processing means 112 then creates the display data based on the transformation result of the mathematical expression outputted from the operating means 114 and outputs it to the displaying means 120. The displaying means 120 displays the display data.

The input and modification (transformation) of the mathematical expression have been carried out in the prior art.

However, considering transformation of the mathematical expression by the operator, it is very difficult for the operator to completely recognize the drop position for obtaining a desired transformation result. In the conventional technique, it is hard for the operator to previously know what the result will be unless the drag-and-drop is once carried out.

As a countermeasure, there is an example contrived to display a transformation result during drag. However, this example always restricts a transformation result displayed during drag to one and loses many transformation possibilities. Additionally, since this example sequentially substitutes the mathematical expression originally displayed during drag in accordance with a transformation result, it is impossible to predict what will change and how during drag and there is no guarantee that the operator can carry out a desired transformation.

That is, there is such a problem as that a desired result can not be readily obtained when transforming the mathematical expression in the conventional technique relating to the mathematical expression transformation using a computer.

SUMMARY OF THE INVENTION

In view of the above-described drawbacks, it is an object of the present invention to provide an apparatus and a method which can obtain a result desired by an operator and display only a final result after transforming a mathematical expression an arbitrary number of times, thereby facilitating derivation of a result of mathematical expression transformation, and a storage medium.

According to an aspect of the present invention, there is provided with an apparatus for transforming a mathematical expression by using a computer, comprising: indicating means for outputting information relating to a position in the mathematical expression specified by a first indication of an operator and information relating to a part in the mathematical expression specified by a second indication of the operator; operating means for generating a plurality of proposed transformation results of the mathematical expression based on the information relating to a position and the information relating to a part outputted from the indicating means; and selecting means for selecting one from a plurality of the proposed transformation results.

In addition, the operating means generates different proposed transformation results as a plurality of the proposed transformation results if the information relating to a position outputted from the indicating means is different.

According to another aspect of the present invention, there is provided with the apparatus, further comprising: selection window controlling means for controlling display of a plurality of the proposed transformation results; selection window generating means for generating a selection window for displaying a plurality of the proposed transformation results under control of the selection window controlling means; and displaying means for displaying the selection window.

According to still another aspect of the present invention, there is provided with the apparatus, further comprising: inputting means for outputting mathematical expression data corresponding to an inputted mathematical expression in accordance with the operation by the operator; and processing means for generating display data corresponding to the mathematical expression data.

Further, the processing means generates display data based on the selection window to be outputted to the displaying means.

Furthermore, the operating means includes proposed mathematical expression transformation generating means for generating a plurality of the proposed transformation results; and proposed mathematical expression transformation holding means for storing and holding a plurality of the proposed transformation results generated by the proposed mathematical expression transformation generating means.

Moreover, the operating means includes a user-defined rule holding means for storing and holding rules for mathematical expression transformation defined by the operator.

According to still another aspect of the present invention, there is provided with the apparatus, further comprising: a storage medium for recording thereon the rules for mathematical expression transformation defined by the operator.

In addition, the user-defined rule holding means reads the rules for mathematical expression transformation from the storage medium and writes the held rules for mathematical expression transformation to the storage medium.

Further, the selecting means outputs a cancel signal to the processing means through the operating means when there is an indication of cancel by the operator, and the processing means deletes the display data based on the selection window when the cancel signal is inputted.

According to still another aspect of the present invention, there is provided with the apparatus, further comprising converting means for converting the mathematical data outputted from the inputting means and thereafter outputting the converted result to the processing means.

Furthermore, when a symbol or a character expression is inputted by the operator, the inputting means outputs symbol data corresponding to the symbol or character expression data corresponding to the character expression; the processing means generates indication data including the symbol data or the character expression data; and the operating means generates a plurality of proposed transformation results based on the indication data.

Moreover, the processing means has an interface for cooperation with another application and performs transmission/reception of data with respect to at least one of the inputting means, the indicating means and the selecting means through another application.

According to still another aspect of the present invention, there is provided with a method for transforming a mathematical expression using a computer, comprising the steps of: outputting information relating to a position in the mathematical expression specified by a first indication of an operator and information relating to a part in the mathematical expression specified by a second indication of the operator; generating a plurality of proposed transformation results of the mathematical expression based on the information relating to a position and the information relating to a part; and selecting one of a plurality of the proposed transformation results by an indication of the operator.

Additionally, when the information relating to a position is different, different proposed transformation results are generated as a plurality of the proposed transformation results.

According to still another aspect of the present invention, there is provided with a storage medium recording thereon a program enabling a computer to execute: processing for outputting information relating to a position in the mathematical expression specified by a first indication of an operator and information relating to a part in the mathematical expression specified by a second indication of the operator; processing for generating a plurality of proposed transformation results of the mathematical expression based on the information relating to a position and the information relating to a part; and processing for selecting one from a plurality of the proposed transformation results by an indication of the operator.

Further, when the information relating to a position is different, different proposed transformation results are generated as a plurality of the proposed transformation results.

According to still another aspect of the present invention, there is provided with a storage medium group for dividing the program into a plurality of parts and recording a plurality of the parts on a plurality of storage mediums.

According to still another aspect of the present invention, there is provided with a program embodied in electrical signals, said program enabling a computer to execute: processing for outputting information relating to a position in the mathematical expression specified by a first indication of an operator and information relating to a part in the mathematical expression specified by a second indication of the operator; processing for generating a plurality of proposed transformation results of a mathematical expression based on the information relating to a position and the information relating to a part; and processing for selecting one from a plurality of the proposed transformation results by an indication of the operator.

A first embodiment according to the present invention will now be described in detail hereinafter.

Figure 1:
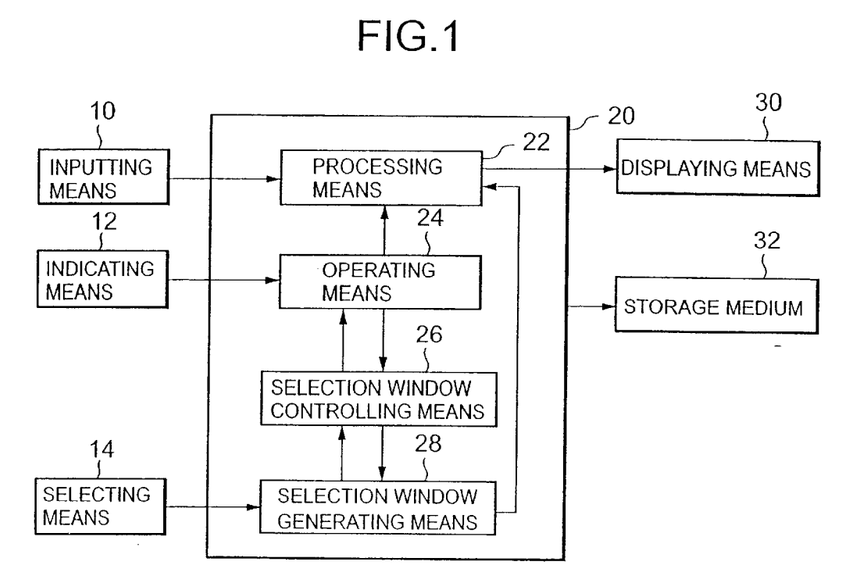
FIG. 1 is a block diagram showing the structure of a first embodiment according to the present invention.

In FIG. 1, inputting means 10 is means used for inputting a mathematical expression by an operator. Indicating means 12 specifies an element in a mathematical expression to be operated and indicates a coordinate for the operation (for example, editing and transformation). Further, the indicating means 12 also outputs an indication signal (for example, "Left Down", "Left Up"). Selecting means 14 selects specific selection information from selection information (for example, information indicating proposed transformations of a mathematical expression) displayed by displaying means 30 based on the operation by the operator and outputs it to selection window generating means 28 which will be described later.

A computer 20 includes processing means 22, operating means 24, selection window controlling means 26 and selection window generating means 28. The processing means 22 generates display data based on mathematical expression data outputted from the inputting means 10 and also produces display data based on selection window data outputted from the selection window generating means 28. The operating means 24 creates and holds a plurality of proposed transformation results of a mathematical expression based on the mathematical expression, which is a target of operation, the coordinate for the operation and the indication signal outputted from the indicating means 12. Here, the operating means 24 generates proposed results in accordance with mathematical rules or rules set by the operator.

Displaying means 30 displays display data outputted from the processing means 22.

In FIG. 1, when the operator operates the inputting means 10 to input a mathematical expression, the processing means 22 creates the display data based on mathematical expression data outputted from the inputting means 10 and outputs it to the displaying means 30. The displaying means 30 displays display data.

The operating means 24 performs grabbing by using a signal indicating a range of the mathematical expression outputted from the indicating means 12. When the range of the mathematical expression is specified, the processing for moving the range of the mathematical expression specified by the operation of the operator (drag) is executed. The operator operates the indicating means 12 to carry out this processing.

Here, the operating means 24 first outputs a drag start signal to the selection window controlling means 26. A plurality of proposed transformation results of the mathematical expression are created and held based on the mathematical expression and the coordinate for the operation outputted from the indicating means 12, and they are outputted to the selection window controlling means 26. Upon receiving the drag start signal, the selection window controlling means 26 outputs a control signal for controlling a window and a plurality of proposed transformation results of the mathematical expression outputted from the operating means 24 to the selection window generating means 28.

The selection window generating means 28 produces selection window data including selection information based on the control signal and a plurality of proposed mathematical expression transformation results outputted from the selection window controlling means 26.

When the operator operates the indicating means 12 to change a drag position (coordinate), the operating means 24 sequentially generates and holds a plurality of the proposed mathematical expression transformation results based on the mathematical expression and the sequentially varying coordinate outputted from the indicating means 12 and outputs them to the selection window controlling means 26. Here, the operating means 24 produces a plurality of proposed results in accordance with mathematical rules or rules set by the operator. The selection window controlling means 26 receives the proposed mathematical expression transformation results outputted from the operating means 24 and outputs the control signal together with this signal to the selection window generating means 28. The selection window generating means 28 generates selection window data including a plurality of the proposed mathematical expression transformation results. The processing means 22 produces the display data based on the selection window data generated by the selection window generating means 28, and the displaying means 30 displays the display data. This processing is repeated every time the operator operates the indicating means 12 to change the coordinate.

When the operator selects given selection information from the displayed selection information, the selecting means 14 outputs the selected selection information to the selection window generating means 28. This selection information is outputted to the operating means 24 through the selection window controlling means 26.

The operating means 24 extracts a selected transformation result from a plurality of proposed transformation results of the held mathematical expression in accordance with the inputted selection information and outputs it to the processing means 22. The processing means 22 generates the display data based on the transformation result outputted from the operating means 24 and outputs it to the displaying means 30. The displaying means 30 displays the display data.

Further, a computer-readable storage medium according to the present invention having a program for executing the processing by the computer recorded thereon corresponds to a storage medium 32 shown in FIG. 1. The program may be read by the computer to realize the above-described processing.

In this manner, the present invention can display proposed transformation results of the mathematical expression corresponding to the drag position during the drag operation by the operator and determine a transformation result of the mathematical expression by the drop operation.

Furthermore, in case of selecting a proposed transformation result of the mathematical expression, when the operator instructs cancel of the operation by the selecting means 14, the selecting means 14 outputs a cancel signal to the operating means 24 through the selection window generating means 28 and the selection window controlling means 26. When this cancel signal is inputted, the operating means 24 further outputs the cancel signal to the processing means 22. In response to this, the processing means 22 outputs the cancel signal to the display means 30. Upon receiving the cancel signal, the displaying means 30 stops displaying the display data based on the selection information.

In this way, the present invention can cancel the once-instructed operation for transforming the mathematical expression after confirming the proposed transformations.

BRIEF DESCRIPTION OF THE DRAWINGS

Other features and advantages of the invention will become apparent from the detailed description hereunder, taken in conjunction with the accompanying drawings, wherein.

DETAILED DESCRIPTION OF THE PREFERRED EMBODIMENTS

The preferred embodiments according to the present invention will now be described with reference to the accompanying drawings.

First Embodiment

Figure 2:
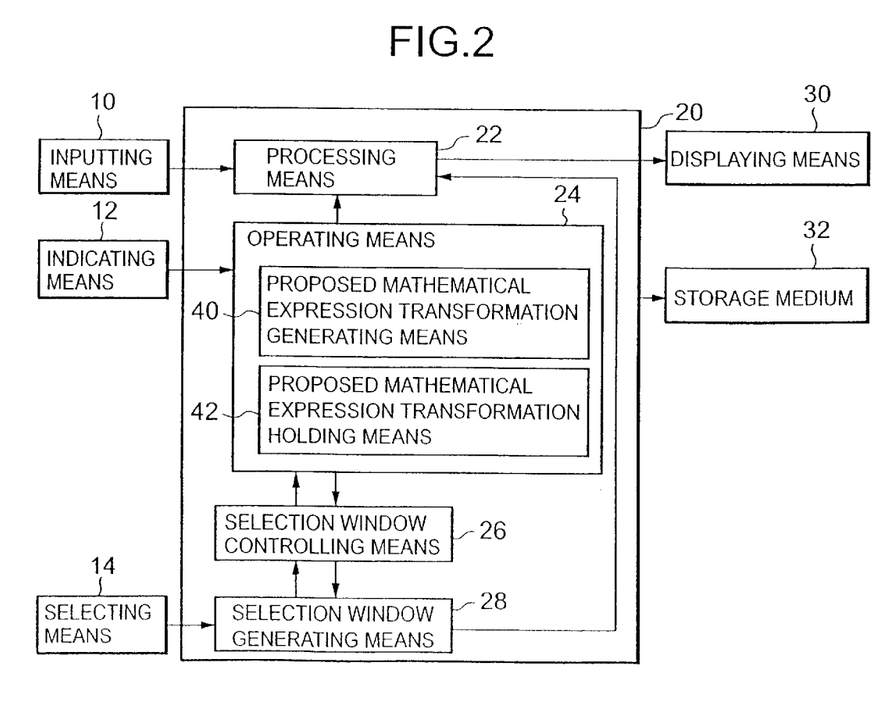
FIG. 2 is a block diagram showing the structure of the first embodiment according to the present invention.

In FIG. 2, reference numeral denotes inputting means by which an operator inputs a mathematical expression. The inputting means 10 is, for example, a keyboard, a mouse, a pen and others. Reference numeral 12 designates indicating means for specifying an element in a mathematical expression to be operated and indicating a coordinate for the operation (for example, editing, transformation and the like). The indicating means 12 is, for example, a keyboard, a mouse, a pen and others. The inputting means is mainly used when the operator inputs a mathematical expression and it outputs mathematical expression data corresponding to the inputted mathematical expression. The indicating means 12 is mainly used when the operator specifies a modification position and the like and it outputs the indicated mathematical expression to be modified, the coordinate and an indication signal. Reference numeral 14 denotes selecting means for outputting selection information selected from selection information (for example, information representing proposed mathematical expression transformations) displayed on later-described displaying means 30 by the operator based on the operation of the operator. The selecting means 14 can be realized by, e.g., a keyboard, a mouse, a pen and others. It is to be noted that an indication signal such as "Left Down" or "Left Up" is also outputted when the inputting means 10, the indicating means 12 and the selecting means 14 are mice.

A computer (central processing unit; processor; data processing unit) 20 includes processing means 22, operating means 24, selection window controlling means 26 and selection window generating means 28. The processing means 22 generates display data based on mathematical expression data outputted from the inputting means 10 and also produces display data based on selection window data outputted from the selection window generating means 28. The operating means 24 generates and holds a plurality of proposed transformation results of a mathematical expression based on the mathematical expression to be operated and a coordinate for the operation outputted from the indicating means 12. Here, the operating means 24 creates a single or multiple proposed results in accordance with mathematical rules or rules set by the operator. Further, the operating means 24 detects a change in the indication signal outputted from the indicating means 12 and performs controls such as grab, drag and drop.

Here, the computer 20 is realized by a general computer, e.g., a personal computer or a work station, and the processing means 22, the operating means 24, the selection window controlling means 26 and the selection window generating means 28 may be realized by software. In addition, the processing means 22, the operating means 24, the selection window controlling means 26 and the selection window generating means 28 may be realized by hardware.

It is to be noted that a phrase "in accordance with mathematical rules" used in this specification means the processing for transposing terms in a mathematical expression (for example, the processing for transforming a mathematical formula "ax=b" into another mathematical formula "ax−b=0"), the processing for dividing the both members of a mathematical expression by a specified term (for example, the processing for transforming a mathematical expression "ax=b" into another mathematical expression "ax/b=1"), the processing for replacing a left member with a right member in a mathematical expression (for example, the processing for transforming a mathematical formula "ax=b" into another mathematical expression "b=ax")and others.

Moreover, the operating means 24 includes proposed mathematical expression transformation generating means 40 and proposed mathematical expression transformation holding means 42.

The proposed mathematical expression transformation generating means 40 generates proposed transformation results of a mathematical expression based on the mathematical expression to be operated and the coordinate for the operation outputted from the indicating means 12. The proposed mathematical expression transformation holding means 42 stores and holds the proposed transformation results of the mathematical expression generated by the proposed mathematical expression transformation generating means 40.

The displaying means 30 is a display unit such as a CRT (cathode ray tube) or an LCD (liquid crystal display) and displays various kinds of display data outputted from the processing means 22.

It is to be noted that to the respective constituent parts in FIG. 2 are given like or corresponding reference numerals of the constituent parts illustrated in FIG. 1.

These means schematically operate as follows.

The computer (central processing unit; processor; data processing unit) 20 executes processing including mathematical expression transformation with respect to a mathematical expression. The inputting means 10 outputs mathematical expression data based on the operation of the operator.

The processing means 22 generates display data based on the data outputted from the operating means 24 and outputs it to the displaying means 30. The displaying means 30 displays the display data outputted from the processing means 22. The indicating means 12 processes an instruction for the mathematical expression processing from the operator and outputs the mathematical expression to be operated, the coordinate for the operation and an indication signal to the operating means 24. The operating means 24 controls the grab, drag and drop operations and generates and holds proposed mathematical expression transformations based on the mathematical expression to be operated and the coordinate for the operation inputted during drag by using the proposed mathematical expression transformation generating means 40 and the proposed mathematical expression transformation holding means 42. The selection window controlling means 26 controls the selection window generating means 28 based on the operation controlled by the operating means 24. The selection window generating means 28 is means for displaying the proposed mathematical expression transformations, which sequentially vary during drag, based on the control of the selection window generating means 28. Moreover, the operating means 24 generates a transformation result of the mathematical expression based on selection information outputted from the selecting means 14 in accordance with the drop operation and outputs it to the processing means 22. The selecting means 14 provides the operator with means for selecting one of a plurality of proposed mathematical expression transformations.

Reference numeral 32 designates a computer-readable storage medium having a program for executing the processing according to the present invention by the computer recorded thereon, and this storage medium is, for example, a semiconductor memory, a floppy disk, a magneto-optical disk or a digital video disk. Therefore, the program recorded on the storage medium 32 may be read by the computer in order to realize the following operation.

Figure 3:
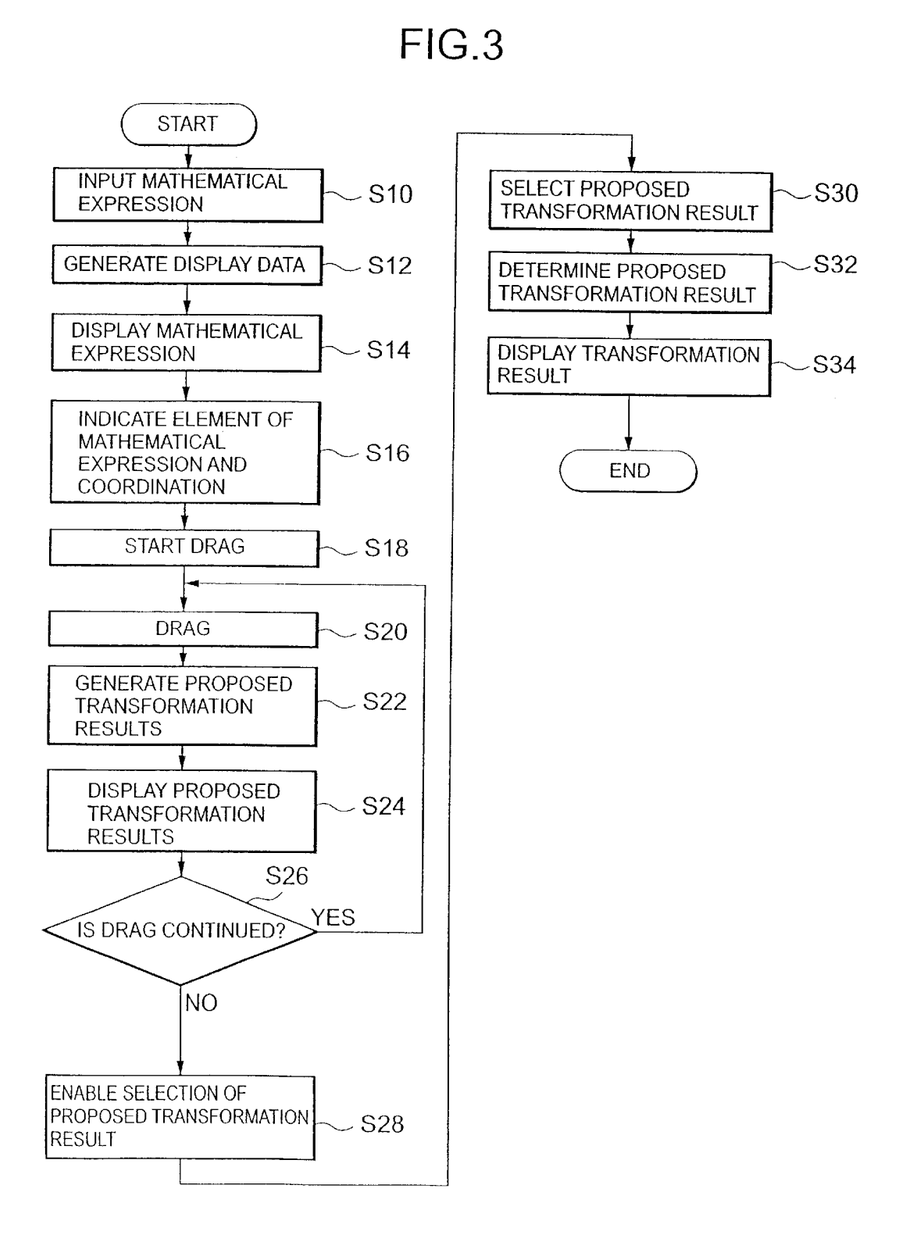
FIG. 3 is a flowchart showing the operation of the first embodiment according to the present invention.

The detailed operation of a first embodiment according to the present invention will now be described with reference to FIGS. 2 to 4.

At first, when a power supply is turned on, the apparatus of this embodiment starts the operation. When the operator operates the inputting means to input a mathematical expression, the inputting means 10 outputs mathematical expression data (step S10).

In this embodiment, input of a mathematical expression "y+c=a" by the operator is exemplified for better understanding.

The mathematical expression data outputted from the inputting means 10 is inputted to the processing means 22. The processing means 22 creates display data based on the mathematical expression data outputted from the inputting means 10 (step S12) and outputs the generated display data to the displaying means 30. The displaying means 30 carries out the display processing based on the display data outputted from the processing means 22 (step S14). Since the mathematical expression "y+c=ax+b" is inputted by the operator in step S10, execution of the processing in step S14 results in display of the mathematical expression "y+c=ax+b" (see FIG. 4(a)).

The operation in case of performing the operation (editing and modification) of the mathematical expression will be explained.

The operator specifies an element in the mathematical expression to be operated by manipulating the indicating means 12 in order to indicate a coordinate for the operation (step S16).

Figure 4A:
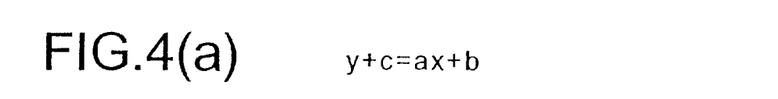
FIGS. 4(a) to (f) are views partially showing a mathematical expression displayed by displaying means 30 of the first embodiment according to the present invention.
Figure 4B:
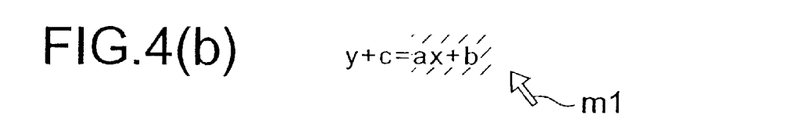

For example, the operator manipulates the indicating means 12 to move a mouse cursor m1 (see FIG. 4(b)) displayed on the displaying means 30 in order to specify a range. That is, the mouse cursor m1 is moved between a symbol "=" and another symbol "a"; the mouse cursor is moved (dragged) while pressing a click button of the mouse; and the click button is released when the mouse cursor m1 is positioned on the right side of the symbol "b."

When the range is specified, the position at which the range is specified is highlighted in reverse video and the like as shown in FIG. 4(b). In FIG. 4(b), the case where all of the right member is selected is exemplified.

The selected range is then dragged to the right side of a symbol "c" of the left member. In this case, the cursor c1 is display at the dragging position (see FIG. 4(c)) (step S18 and step S20).

The above is the operation for transposing each item of the right member illustrated in FIGS. 4(a) and (b) to the left member.

Figure 4C:
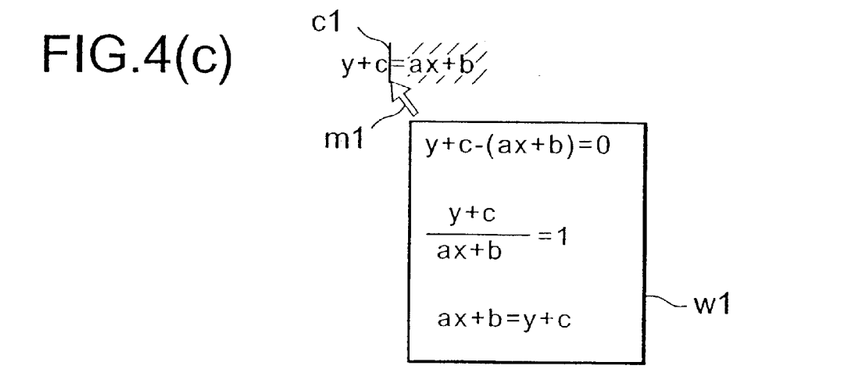

Upon completing the above operation, "ax+b" as the mathematical expression to be operated and the coordinate on the right side of the symbol "c" (the coordinate at which the cursor c1 in FIG. 4(c) is positioned) as the coordinate for the operation are respectively outputted from the indicating means 12 to the operating means 24.

When the mathematical expression to be operated and the coordinate for the operation are inputted during drag, the operating means 24 transfers them to the proposed mathematical expression transformation generating means 40. The proposed mathematical expression transformation generating means 40 generates proposed transformation results of the mathematical expression based on them. Here, the proposed mathematical expression transformation generating means 40 produces a single or a plurality of proposed results as transformation results of the mathematical expression in accordance with mathematical rules (step S22).

The generated proposed transformation results are transferred to the proposed mathematical expression transformation holding means 42 to be stored and held, and they are further outputted to the selection window controlling means 26. In addition, the operating means 24 outputs a signal indicative of start of drag to the selection window controlling means 26.

When the proposed transformation results of the mathematical expression and the signal indicative of start of drag are outputted to the selection window controlling means 26, the selection window controlling means 26 transmits a signal indicative of generation of a selection window to the selection window generating means 28. Further, the selection window controlling means 26 sets the proposed transformation results of the mathematical expression to the selection window generating means 28 and sends a signal indicating display of the selection window to the selection window generating means 28. When the selection window generation signal is inputted, the selection window generating means 28 produces the selection window. Additionally, upon receiving the selection window display signal, the selection window data including the set proposed transformation results of the mathematical expression is outputted to the processing means 22. The processing means 22 receives the selection window data including the selection information from the selection window generating means 26 and generates the display data based on the received data so that the generated data is outputted to the displaying means 30. The displaying means 30 executes the display processing based on the display data including the selection information (step S24).

The selection information is displayed in a sub window w1 as shown in FIG. 4(c). In the example shown in FIG. 4(c), three types of proposed selection information are displayed. That is, transposition of the right member to the left member, division of the both members by a mathematical expression "ax+b" and replacement of the left member with the right member are displayed.

Description will now be give as to the processing when the operator further performs drag to display the proposed transformation results on another coordinate.

The indicating means 12 first sequentially outputs to the operating means 24 the coordinate for the operation which sequentially varies with movement of the mouse cursor during drag. When the operating means 24 detects that the inputted coordinate for the operation has changed from the position on the right side of the symbol "c" to the position on the right side of the symbol "+" in the left member, the indicating means 24 transmits a signal indicative of a change in position during drag and outputs a new coordinate for the operation to the proposed mathematical expression transformation generating means 40. Upon receiving the signal indicating a change in position during drag, the selection window controlling means 26 sends a selection window non-display signal to the selection window generating means 28. When the selection window non-display signal is inputted, the selection window generating means 28 stops transmission of data to the processing means 22 so that the display data of the selection window is not displayed (step S26 and step S20).

The proposed mathematical expression transformation generating means 40 creates newly proposed transformation results based on the new coordinate for the operation inputted from the operating means 24. The proposed mathematical expression transformation holding means 42 having received the newly proposed results deletes the old proposed results to store and hold the newly proposed results and outputs the newly proposed results to the selection window controlling means 26 (step S22).

At last, upon receiving the newly proposed results, the selection window controlling means 26 sets them to the selection window generating means 28 and outputs the selection window display signal.

Figure 4D:
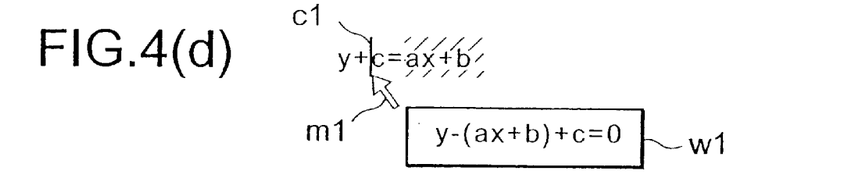

In FIG. 4(d), one proposed result according to the operation for transposing the right member between the symbols "+" and "c" in the left member is displayed as new selection information (step S24).

Based on repetition of the above procedure, the operator can obtain desired proposed transformation results by dragging to arbitrary positions.

Figure 4E:
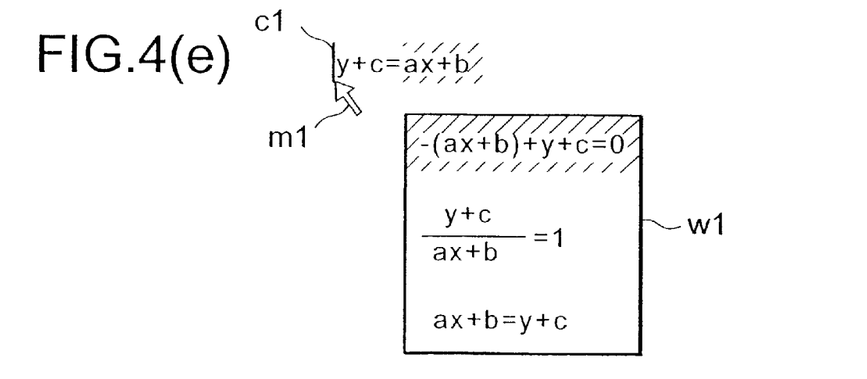
Figure 4F:
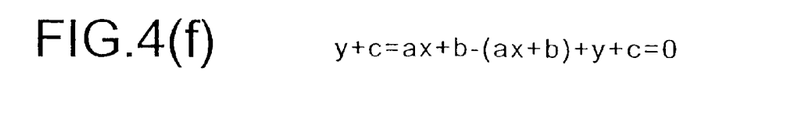

It is assumed that the operator intends to transpose all the items in the right member to the left side of the symbol "y" in the left member. Then, FIG. 4(e) illustrates the state during drag in which the results desired by the operator are displayed.

Description will now be given as to the processing when generating the mathematical expression after transformation by selecting a desired transformation result from the displayed proposed transformation results by the operator.

In the first place, when the operator releases the click button, the indicating means 12 outputs the indication signal "Left Up" to the operating means 24. The operating means 24 which has received the indication signal "Left Up" during the drag operation recognizes this reception as the drop operation and outputs a signal indicating that the drop operation has been carried out to the selection window controlling means 26. The selection window controlling means 26 transmits a signal for allowing selection of the selection signal to the selection window generating means 28. When the selection window generating means 28 becomes capable of selecting the selection information, the operator can effect selection (step S28).

The operator first operates the selecting means 14 to move the mouse cursor m1 to a desired position in the mathematical expression within the selection window.

It is to be noted that an arrow key provided on the keyboard may be operated to carry out selection in place of moving the mouse cursor c1 when performing selection.

In case of using the mouse cursor m1 to perform selection, the mouse button is clicked after moving the mouse cursor m1 to a desired position in the mathematical expression. When the mouse button is clicked, the selected mathematical expression is highlighted as shown in FIG. 4(e) (step S30).

Further, when operating the keyboard to effect selection, the arrow key is operated to move the cursor to a desired position in the mathematical expression and thereafter a return key is pressed (step S32). Here, it is possible to provide a function for terminating this selection mode by clicking the mouse outside the selection window or pressing an ESC key disposed on the keyboard in the selection mode.

In FIG. 4(e), it is assumed that a mathematical expression "−(ax+b)+y+c=0" is selected.

The selection window generating means 28 outputs the selection information selected from the selection data by the operator to the operating means 24 through the selection window controlling means 26.

The operating means 24 extracts a selected mathematical expression transformation result from a plurality of proposed transformation results of the mathematical expression held in the proposed mathematical expression transformation holding means 42 and outputs it to the processing means 22. The processing means 22 generates the display data based on the transformation result of the mathematical expression outputted from the operating means 24. The displaying means 30 executes the display processing based on the display data outputted from the processing means 22 (step S34).

In the processing of step S34, the sub window w1 displayed in FIG. 4(e) is deleted and the selected mathematical expression "−(ax+b)+y+c=0" is displayed in the line under the mathematical expression "y=ax+b" displayed in the processing of step S14.

As described above, according to the first embodiment of the present invention, a plurality of proposed transformation results corresponding to the position of the mouse cursor which sequentially changes can be displayed during drag of the mouse and desired proposed result can be selected and determined at the position this result is displayed.

Second Embodiment

A second embodiment according to the present invention will now be explained.

Figure 5:
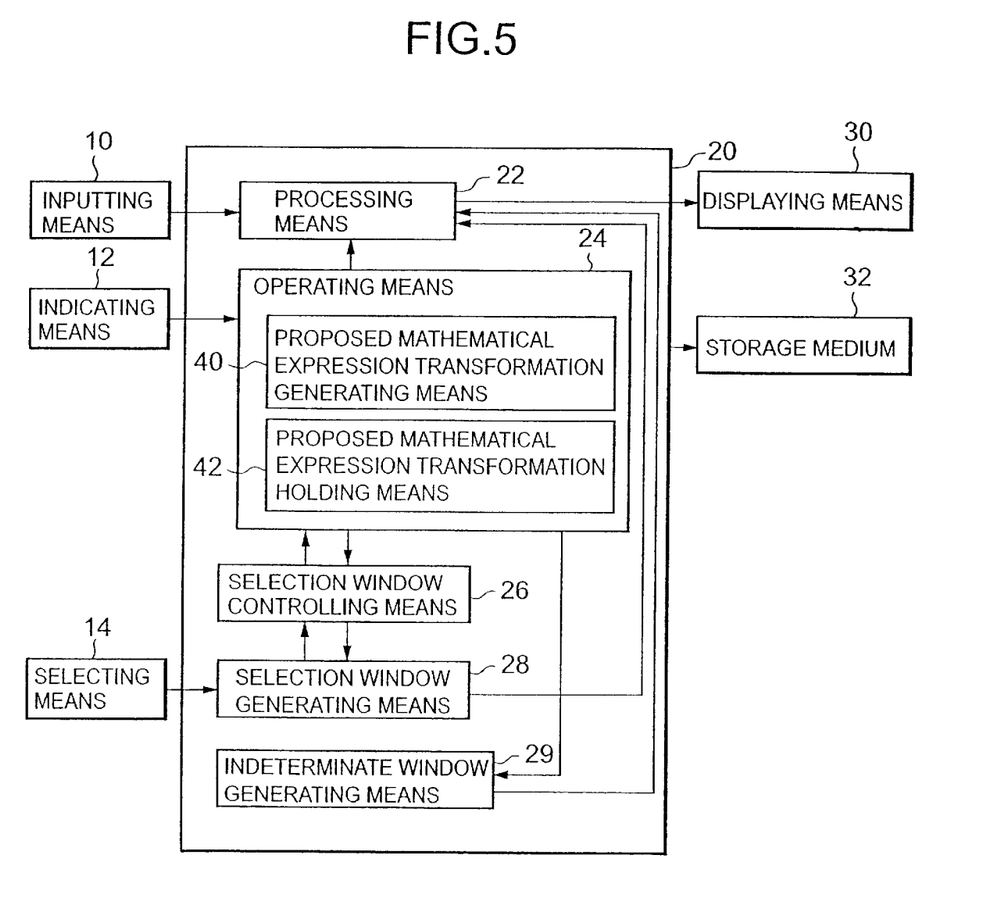
FIG. 5 is a block diagram showing the structure of a second embodiment according to the present invention.

In FIG. 5, to parts equal to the respective parts of the first embodiment shown in FIG. 2 are given the same reference numerals to omit their explanation.

A difference of the second embodiment illustrated in FIG. 5 from the first embodiment shown in FIG. 2 lies in that an indeterminate window generating means 29 is provided.

The second embodiment according to the present invention temporarily displays a transformation result of the mathematical expression in the indeterminate window without immediately determining this result and repeats transformations in this window several times to thereafter realize determination of the transformation result which is requested to be continuously displayed.

The detailed description of this embodiment will be given hereinafter.

The indeterminate window generating means 29 receives and holds the transformation result of the mathematical expression selected and determined by the operator from the operating means 24. The indeterminate window generating means 29 outputs the indeterminate window data including the held transformation result to the processing means 20. The processing means produces the display data based on the indeterminate window data and transmits it to the displaying means 30. The displaying means 30 displays this display data.

Here, the mathematical expression displayed in the indeterminate window can be transformed as similar to regular mathematical expressions. When selecting/determining the proposed transformation result by transforming the mathematical expression in the indeterminate window, however, the display mathematical expression is deleted and the newly selected/determined mathematical expression is displayed.

Subsequently, when the indeterminate window is displayed, the mouse button can be clicked at the position outside the indeterminate window or the return key can be pressed to determine the transformation result.

This is realized as follows. When the mouse which is the indicating means 12 is clicked, the clicked position and the indication signal are first outputted. The operating means 24 inputs them and recognizes determination of the indeterminate window. A determination signal is then transmitted to the indeterminate window generating means 29.

Upon receiving the determination signal, the indeterminate window generating means 29 first sends a signal for deleting display of the indeterminate window to the processing means 22. When the processing means 22 receives this signal, it deletes the indeterminate window display data and outputs a signal for deleting display of the indeterminate window to the displaying means 30. The displaying means 30 stops display of the indeterminate window. The indeterminate window generating means 29 then outputs the mathematical expression data displayed in the indeterminate window to the processing means 22. The processing means 20 converts the mathematical expression data into the display data and outputs it to the displaying means 30 where this data is displayed.

In accordance with these procedures, the transformation result of the mathematical expression is not immediately pasted, but only the mathematical expression which is requested to be continuously displayed is pasted after repeating transformations on the indeterminate window several times.

It is to be noted that the storage medium 32 shown in FIG. 5 is a computer-readable storage medium recording thereon a program for executing the processing of the second embodiment according to the present invention by the computer, and the programmed function of the indeterminate window generating means 29 is recorded onto the storage medium in the first embodiment. Thus, the second embodiment may be realized by reading the content by the computer to be executed.

Third Embodiment

A third embodiment according to the present invention will now be described.

Figure 6:
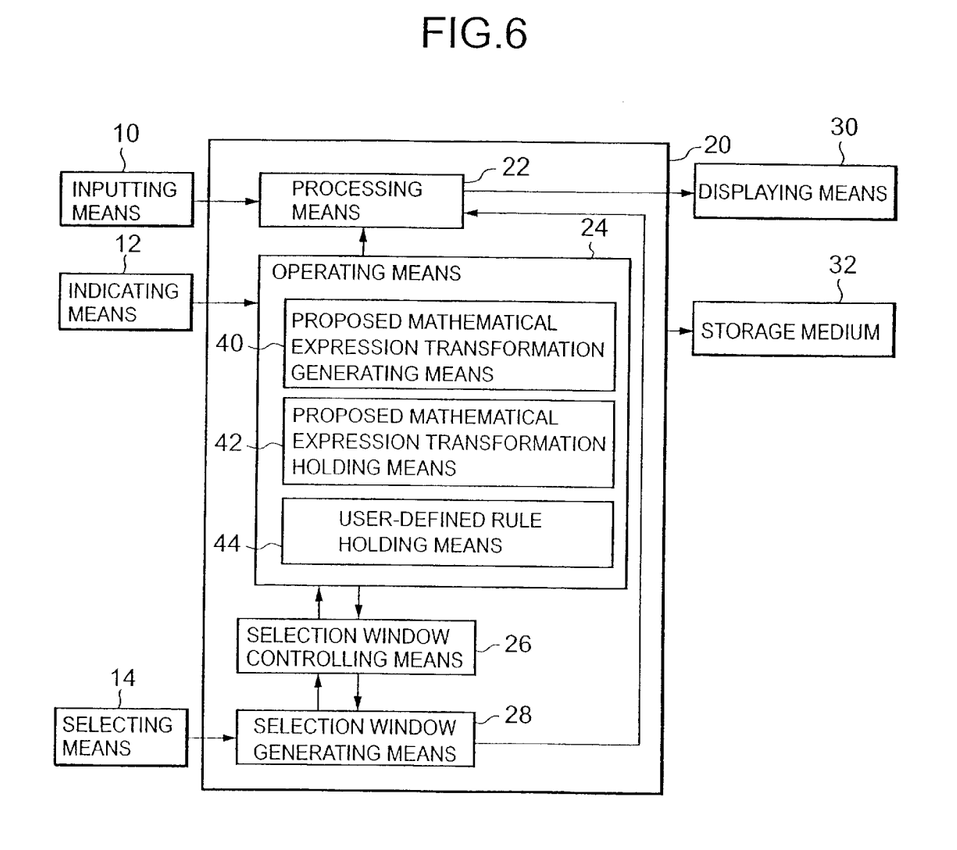
FIG. 6 is block diagram showing the structure of a third embodiment according to the present invention.

In FIG. 6, the same reference numerals are given to parts similar or corresponding to the respective parts in the first embodiment shown in FIG. 2, thereby omitting their explanation.

A difference of the third embodiment shown in FIG. 6 from the first embodiment depicted in FIG. 2 lies in that the operating means 24 is provided with user-defined rule holding means 44.

The user-defined rule holding means 44 can hold rules for the mathematical expression transformation directly inputted by the operator and it is also capable of reading and holding the rules from the storage medium 32 or writing the held rules onto the storage medium 32.

Further, the storage medium 32 is a computer-readable storage medium recording thereon the program for executing the processing of the third embodiment according to the present invention by the computer, and it may be a magnetic disk, a semiconductor memory or any other storage medium. On this storage medium 32 may be written the user-defined rules as will be described later.

A mathematical expression processing program is read from the storage medium 32 to the computer (central processing unit; processor; data processing unit) and controls the operation of the computer 20. The computer 20 executes the following processing, i.e., the processing equal to that by the computer in the first embodiment, by the control of the mathematical expression processing program.

Although the operating means 24 (proposed mathematical expression transformation generating means 40) generates a plurality of proposed transformation results of the mathematical expression in accordance with general mathematical rules in the first embodiment, the operating means 24 produces a plurality of proposed transformation results of the mathematical expression in accordance with both the general mathematical rules and rules held by the user-defined rule holding means 44.

Therefore, according to the third embodiment, since a plurality of the proposed transformation results of the mathematical expression can be obtained in accordance with the rules desired by the operator, the operation (variables and transformations) of the mathematical expression can be further facilitated.

Incidentally, although the operating means 24 generates a plurality of the proposed transformation results of the mathematical expression in accordance with the general mathematical rules and the rules held by the user-defined rule holding means 44, the proposed results may be produced in accordance with only the rules held by the user-defined rule holding means 44.

Fourth Embodiment

A fourth embodiment according to the present invention will now be explained.

Figure 7:
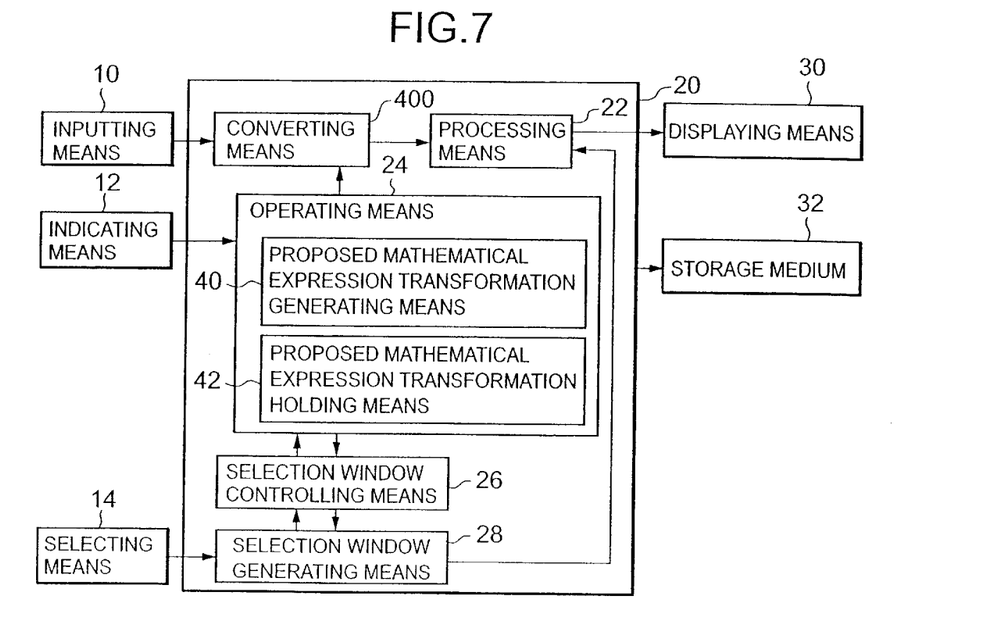
FIG. 7 is a block diagram showing the structure of a fourth embodiment according to the present invention.

In FIG. 7, to parts equal to the respective parts in the first embodiment shown in FIG. 2 are give the same reference numerals, thereby omitting their explanation.

A difference of the fourth embodiment shown in FIG. 7 from the first embodiment illustrated in FIG. 2 lies in that converting means 400 is provided and the inputting means is connected to the converting means 400 which is further connected to the processing means 22.

The converting means 400 creates converted data by converting the input data and sends it to the processing means 22. The input data used herein may have a standard format such as TEX and MATHML, any other original format, a composite format or a format represented by multiple data groups, and the converting means 400 converts such a format into another format to be internally processed. In the fourth embodiment according to the present invention, input which does not depend on data formats is possible by performing such conversion.

It is to be noted that the converting means 400 may perform display data conversion, stored data conversion or conversion within the processing as well as input data conversion in this embodiment.

Fifth Embodiments

A fifth embodiment according to the present invention will now be described.

Figure 8:
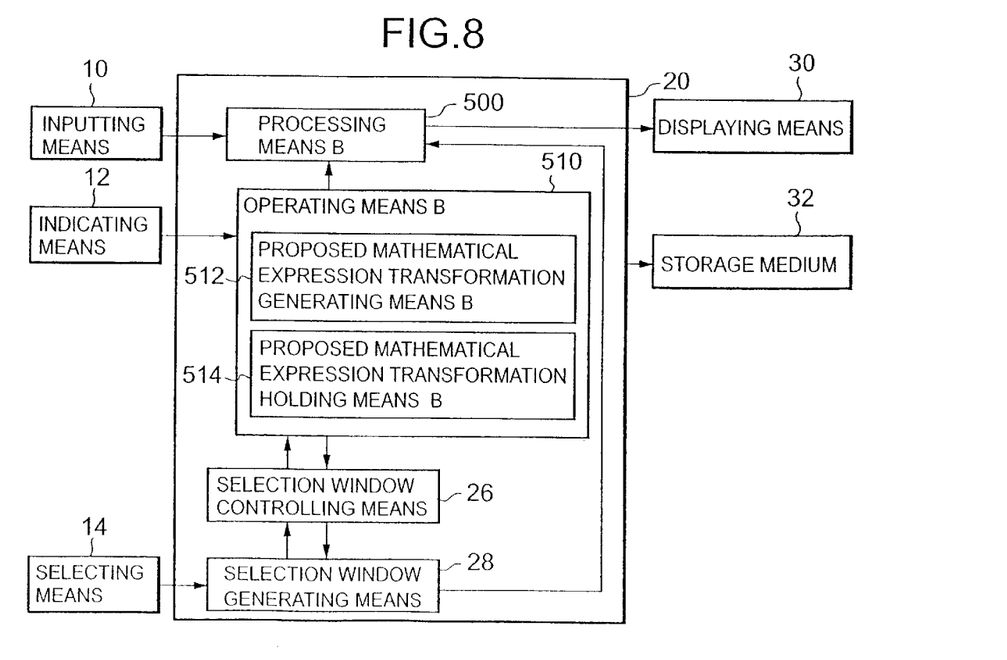
FIG. 8 is a block diagram showing the structure of a fifth embodiment according to the present invention.

In FIG. 8, to parts equal to the respective parts in the first embodiment shown in FIG. 2 are given the same reference numerals, thereby omitting their explanation.

A difference of the fifth embodiment depicted in FIG. 8 from the first embodiment shown in FIG. 2 lies in that processing means B500 is connected to operating means B510.

The processing means B500 creates the indication data including the mathematical expression data based on the mathematical expression data outputted from the inputting means 10 and outputs it to the operating means B510. The operating means B510 uses proposed mathematical expression transformation generating means B512 and proposed mathematical expression transformation holding means B514 to produces a plurality of the proposed transformation results of the mathematical expression based on the indication data including the mathematical expression data in accordance with the mathematical rules or the rules set by the operator.

In this manner, transformation realized by inputting the mathematical expression is possible as well as transformation conducted by indicating the coordinate in the fifth embodiment according to the present invention.

The specific operation of the fifth embodiment according to the present invention will now be described with reference to FIGS. 8 and 9.

In the first place, when the power supply is turned on, this embodiment starts the operation. When the operator manipulates the inputting means to input the mathematical expression, the inputting means 10 outputs the mathematical expression data.

In this embodiment, the case where the operator inputs a mathematical expression "y+c=ax+b" is inputted is exemplified for the better understanding.

The mathematical expression data outputted from the inputting means 10 is inputted to the processing means B500. The processing means B500 produces the display data based on the mathematical expression data outputted from the inputting means 10 and outputs the thus created display data to the displaying means 30. The displaying means 30 executes the display processing based on the display data outputted from the processing means B500 (see FIG. 9(a)).

The operation in case of performing the operation (editing and modification) realized by inputting the mathematical expression will now be explained.

The operator operates the indicating means 12 to specify a position between elements of the mathematical expression which is a target of the operation and indicates a coordination for the operation.

Figure 9A:
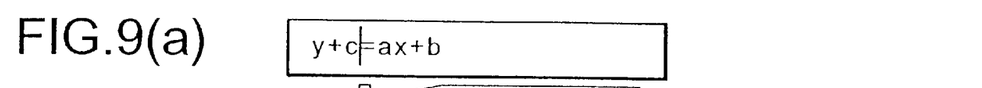
FIGS. 9(a) to (f) are views partially showing a mathematical expression displayed by displaying means 30 of the fifth embodiment according to the present invention.
Figure 9B:
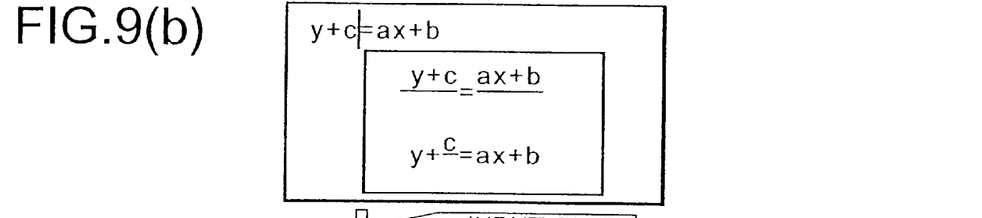
Figure 9C:
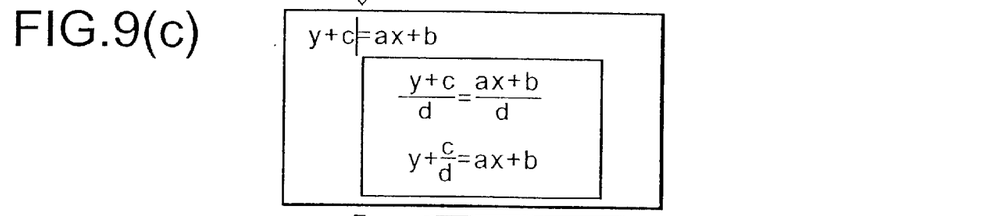

For example, the operator specifies the position between "c" and "=" by clicking the click button of the mouse on the mathematical expression displayed by the displaying means 30 (see FIG. 9(a)).

When the operator input "/" by operating the inputting means 20, the processing means B500 creates indication data including information representative of input of "/" and outputs it to the operating means B510. In the operating means B510, the proposed mathematical expression transformation generating means B512 generates a mathematical formula obtained by dividing the both members in "y+c=ax+b" and another mathematical formula obtained by dividing only "c" as two proposed transformation results. Here, the proposed mathematical expression transformation generating means B512 creates a single or a plurality of proposed results as the transformation results of the mathematical expression in accordance with the mathematical rules.

The generated proposed transformation results are transferred to the proposed mathematical expression transformation holding means B512 to be stored therein and further outputted to the selection window controlling means 26. The operating means B500 outputs a signal indicative of start of drag to the selection window controlling means 26 (see FIG. 9(b)).

When the operator inputs "d", the operating means B510 creates next proposed transformation results, i.e., a mathematical expression obtained by dividing the both members in "y+c=ax+b" by "d" and another mathematical expression obtained by dividing only "c" by "d", from a plurality of the proposed transformation results held by the proposed mathematical expression transformation holding means B514 and the inputted "d."

In addition, the generated proposed transformation results are transferred to the proposed mathematical expression transformation holding means B514 to be stored therein and further outputted to the selection window controlling means 26 (see FIG. 9(a)).

Figure 9D:
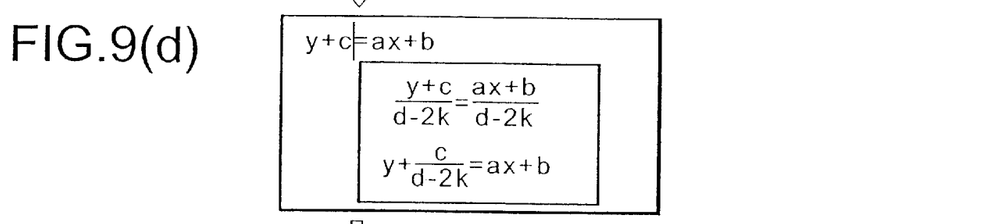

In this way, when the operator further inputs "−2k", a result obtained by dividing the both members in "y+c=ax+b" by "d−2k" and another result obtained by dividing only "c" by "d−2k" are produced and outputted to the selection window controlling means 26 (see FIG. 9(d)).

Figure 9E:
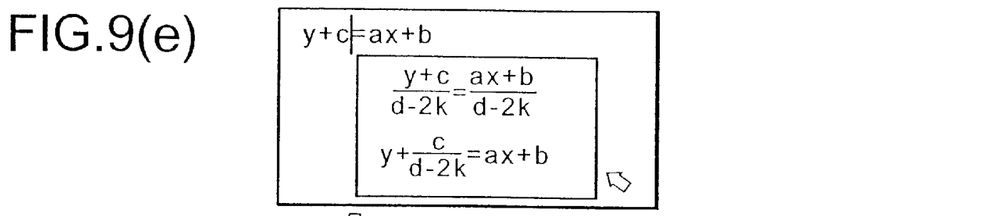
Figure 9F:
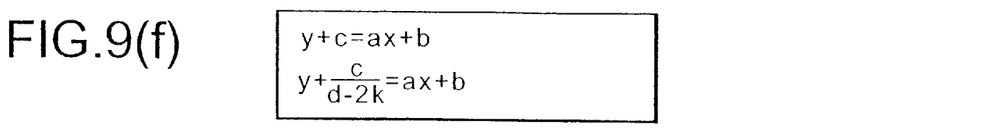

At last, as similar to the operation (see FIGS. 4(e) and (f)) of the first embodiment according to the present invention, any desired transformation result is displayed in the line under the initially displayed formula "y+c=ax+b" by selecting arbitrary one from a plurality of proposed results by the operator (see FIGS. 9(e) and (f)).

As described above, according to the fifth embodiment of the present invention, a plurality of proposed transformation results of the mathematical expression can be displayed based on the information inputted by the operator once or continuous multiple times and any desirable result can be selected and determined.

Although a plurality of proposed results are generated in accordance with the general mathematical rules in the above example, they may be produced in accordance with previously defined rules. For example, proposed transformation results to which "sin( )" and "Sigma" are added thereto may be generated when "s" and "i" are inputted; only the proposed results having "Sigma" added thereto are displayed when "g" is further inputted; and transformation results having a symbol "σ" added thereto may be displayed by selecting these proposed results.

Sixth Embodiment

A sixth embodiment according to the present invention will now be described.

Figure 10:
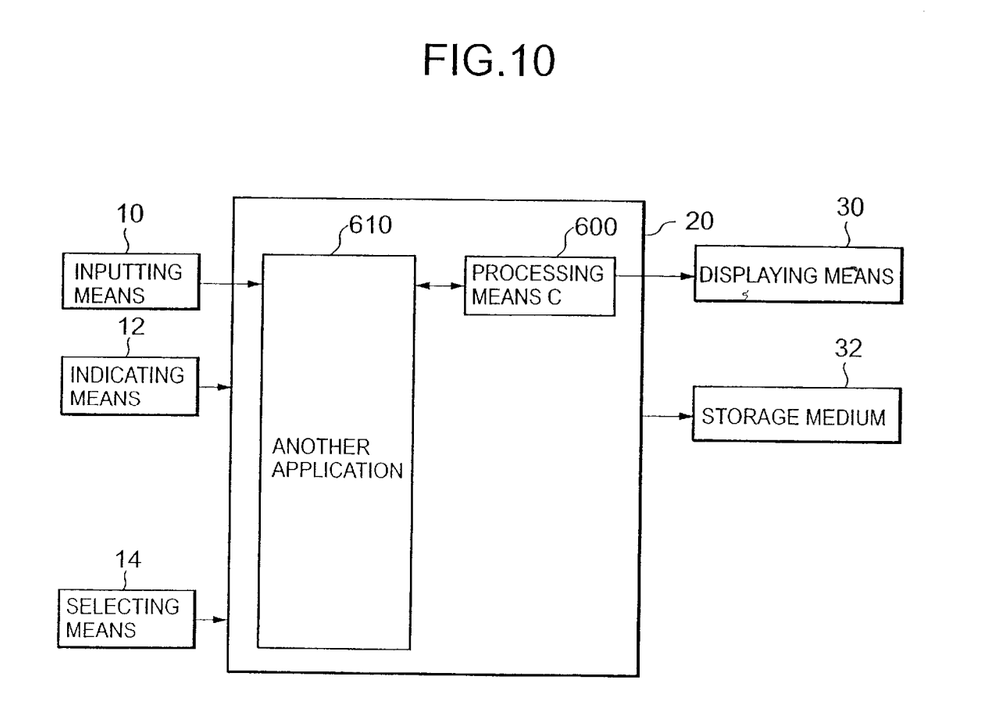
FIG. 10 is a block diagram showing the structure of a sixth embodiment according to the present invention.

In FIG. 10, like reference numerals denote like or corresponding parts of the first embodiment shown in FIG. 2, thereby omitting their explanation.

A difference of the sixth embodiment depicted in FIG. 10 from the first embodiment illustrated in FIG. 2 lies in that: processing means C600 is provided with an interface with another application 610; the inputting means is connected to this application 610; and the indicating means 12 and the selecting means 14 are respectively connected to the personal computer 20.

Another application 610 generates mathematical expression data B including the mathematical expression data outputted from the inputting means 10 based on this mathematical expression data and outputs the thus produced data to the processing means C600. The processing means C600 carries out the mathematical expression transformation from the inputted mathematical expression data B as similar to the first embodiment. Another application 610 and the processing means C600 can input and output the information for cooperation with each other.

It is also possible to change an OS in order to enable direct input/output of the data between the three members, i.e., the indicating means 12, selecting means 14 and the storage medium 32 and the program or another application 610 for executing the processing of this embodiment.

With such an arrangement, it is possible to effect the mathematical expression processing in cooperation with an arbitrary other application in the sixth embodiment according to the present invention. For example, an internet browser or a word processor can be used as another application. Further, an OLE application or an OCX a component, a JAVA component and the like can be used as a cooperating system.

Although the above has described as to the embodiments according to the present invention, the present invention is not restricted these embodiments, and any other modification is possible within the scope of the invention.

As described above, since the present invention comprises the indicating means for outputting the position and the mathematical expression in accordance with the operation of the operator, the operating means for generating a plurality of proposed transformation results of the mathematical expression based on the position and the mathematical expression outputted from the indicating means, and the selecting means for selecting one from a plurality of the proposed transformation results in accordance with the operation of the operator, any desired result can be readily obtained when transforming the mathematical expression, thereby facilitating creation of the mathematical expression.

In addition, when the operator instructs cancel, the cancel signal is outputted from the operating means to delete the display data, but since a plurality of the proposed transformation results of the mathematical expression are stored and held, a non-intended instruction generated by an erroneous operation can be canceled, thereby further facilitating creation of the mathematical expression.

What is claimed is:

1. An apparatus for transforming a mathematical expression by using a computer, comprising:

an indicating mechanism configured to output information relating to a position within said mathematical expression specified by a first indication by an operator and information relating to a part in said mathematical expression specified by a second indication by said operator;

an operating mechanism configured to generate a plurality of proposed transformation results of said mathematical expression based on said information relating to said position within said mathematical expression and said information relating to a part outputted from said indicating mechanism, said proposed transformation results being successively generated and displayed while said indicating mechanism is moving within said mathematical expression; and a selecting mechanism configured to, upon indication of said operator, select one from a plurality of said proposed transformation results once said indicating mechanism stops within said mathematical expression.

2. An apparatus as claimed 1, wherein said operating means generates different proposed transformation results as a plurality of said proposed transformation result if said information relating to a position outputted from said indicating means is different.

3. An apparatus as claimed in claim 1, further comprising:

selection window controlling means for controlling display of a plurality of said proposed transformation results;

selection window generating means for generating a selection window for displaying a plurality of said proposed transformation results under control of said selection window controlling means; and displaying means for displaying said selection window.

4. An apparatus as claimed in claim 3, wherein a processing means is configured to generate display data based on said selection window and outputs it to said displaying means.

5. An apparatus as claimed in claim 4, wherein a selecting means outputs a cancel signal to said processing means through said operating means when said operator instructs cancel, and said processing means deletes display data based on said selection window when said cancel signal is inputted.

6. An apparatus as claimed in claim 1, further comprising:

inputting means for outputting mathematical expression data corresponding to an inputted mathematical expression in accordance with an operation of said operator; and processing means for generating display data corresponding to said mathematical expression data.

7. An apparatus as claimed in claim 6, further comprising:

converting means for converting mathematical expression data outputted from said inputting means to be thereafter outputted to said processing means.

8. An apparatus as claimed in claim 6, wherein said processing means has an interface for cooperating with another application in order to transmit/receive data to/from at least one of said inputting means, said indicating means and said selecting means through said another application.

9. An apparatus as claimed in claim 6, wherein when said operator inputs a symbol or character expression, said inputting means outputs symbol data corresponding to said symbol or character expression data corresponding to said character expression; said processing means generates indication data including said symbol data or said character expression data; and said operating means generates a plurality of proposed results based on said indication data.

10. An apparatus as claimed in claim 1, wherein said operating means includes proposed mathematical expression transformation generating means for generating a plurality of said proposed transformation results and proposed mathematical expression transformation holding means for storing and holding a plurality of said transformation results generated by said proposed mathematical expression transformation generating means.

11. An apparatus as claimed in claim 1, wherein said operating means includes user-defines rule holding means for storing and holding mathematical expression transformation rules defined by said operator.

12. An apparatus as claimed in claim 11, further comprising:

a storage medium for recording thereon said mathematical expression transformation rules defined by said operator.

13. An apparatus as claimed in claim 12, wherein said user-defined rule holding means reads said mathematical expression transformation rules from said storage medium and writes said mathematical expression transformation rules held therein onto said storage medium.

14. A method for transforming a mathematical expression by using a computer comprising:

outputting information relating to a position within said mathematical expression specified by a first indication by an operator and information relating to a part in said mathematical expression specified by a second indication by said operator;

generating a plurality of proposed transformation results of said mathematical expression based on said information relating to said position within said mathematical expression and said information relating to a part, said proposed transformation results being successively generated and displayed while said indicator means is moving within said mathematical expression; and selecting, upon indication of said operator, one from a plurality of said proposed transformation results once said indicator mechanism stops within said mathematical expression.

15. A method as claimed in claim 14, wherein different proposed transformation results are generated as a plurality of said proposed transformation results if said information relating to a position is different.

16. A storage medium recording thereon a program enabling a computer to execute:

processing for outputting information relating to a position within said mathematical expression specified by a first indication by an operator and information relating to a part in said mathematical expression specified by a second indication by said operator;

processing for generating a plurality of proposed transformation results of said mathematical expression based on said information relating to said position within said mathematical expression and said information relating to a part, said proposed transformation results being successively generated and displayed while said indicator means is moving within said mathematical expression; and processing for selecting, upon indication of said operator, one from a plurality of said proposed transformation results once said indicator mechanism stops within said mathematical expression.

17. A storage medium as claimed in claim 16, wherein different proposed transformation results are generated as a plurality of said transformation results when said information relating to a position is different.

18. A storage medium group, wherein said program defined in claim 16 is divided into a plurality of parts and a plurality of said parts are recorded onto each of a plurality of storage mediums.

19. A program embodied in electrical signals, said program enabling a computer to execute:

processing for outputting information relating to a position within said mathematical expression specified by a first indication by an operator and information relating to a part in said mathematical expression specified by a second indication by said operator;

processing for generating a plurality of proposed transformation results of said mathematical expression based on said information relating to said position within said mathematical expression and said information relating to a part, said proposed transformation results being successively generated and displayed while said indicator means is moving within said mathematical expression; and processing for selecting, upon indication of said operator, one from a plurality of said proposed transformation results once said indicator mechanism stops within said mathematical expression.

* * * * *